United States Patent
Bertolli

(10) Patent No.: US 11,538,352 B2
(45) Date of Patent: Dec. 27, 2022

(54) PERSONALIZED LEARNING VIA TASK LOAD OPTIMIZATION

(71) Applicant: Avrio Analytics LLC, Knoxville, TN (US)

(72) Inventor: Michael G. Bertolli, Knoxville, TN (US)

(73) Assignee: Avrio Analytics LLC, Knoxville, TN (US)

( * ) Notice: Subject to any disclaimer, the term of this patent is extended or adjusted under 35 U.S.C. 154(b) by 0 days.

(21) Appl. No.: 17/666,228

(22) Filed: Feb. 7, 2022

(65) Prior Publication Data

US 2022/0327949 A1    Oct. 13, 2022

Related U.S. Application Data

(60) Provisional application No. 63/171,714, filed on Apr. 7, 2021.

(51) Int. Cl.
| | |
|---|---|
| *G09B 19/00* | (2006.01) |
| *G09B 9/00* | (2006.01) |
| *A62C 99/00* | (2010.01) |

(52) U.S. Cl.
CPC ............. *G09B 9/00* (2013.01); *G09B 19/003* (2013.01); *A62C 99/0081* (2013.01)

(58) Field of Classification Search
CPC ... G09B 19/00; G06F 2203/011; G06F 3/013; G06F 21/316; A61B 5/163; A61B 5/165
See application file for complete search history.

(56) References Cited

U.S. PATENT DOCUMENTS

| | | |
|---|---|---|
| 10,783,801 B1 | 9/2020 | Beaubien et al. |
| 2004/0248071 A1* | 12/2004 | Bedziouk .............. A63B 24/00 434/247 |

(Continued)

FOREIGN PATENT DOCUMENTS

| | | | |
|---|---|---|---|
| EP | 345985 A2 * | 12/2018 | ........... A61B 5/0077 |
| WO | WO-2021021328 A2 * | 2/2021 | .............. G06F 3/011 |
| WO | WO-2021067380 A1 * | 4/2021 | ........... A61B 5/0077 |

OTHER PUBLICATIONS

Rodriguez, Kari; International Search Report and Written Opinion of counterpart PCT Application No. PCT/US22/15490 dated May 11, 2022.

*Primary Examiner* — Robert J Utama
(74) *Attorney, Agent, or Firm* — Chambliss, Bahner & Stophel, P.C.; Stephen D. Adams

(57) ABSTRACT

A method for providing task load-optimized computer-generated training experiences to a user of a training system that includes: a display, a training simulator, a prediction program (ML1), and a training optimization program (ML2). In response to receiving a predicted optimal task load, ML2 provides a first training experience recommendation related to the training content and/or training conditions that, if utilized in providing a training experience to the user, is predicted to result in the predicted actual task load of the user equaling the predicted optimal task load. In response to receiving biometric information or performance metric information, ML1 determines the predicted actual task load. If the predicted actual task load does not match the predicted optimal task load, ML2 provides a second training experience recommendation and a second training experience is provided where at least one of the training content or the training conditions is changed.

20 Claims, 4 Drawing Sheets

(56) References Cited

U.S. PATENT DOCUMENTS

2014/0186801 A1 7/2014 Slayton et al.
2020/0082735 A1 3/2020 Nel et al.

* cited by examiner

PERSONALIZED LEARNING VIA TASK LOAD OPTIMIZATION

CROSS-REFERENCE TO RELATED APPLICATIONS

This application claims the benefit of U.S. Provisional Application No. 63/171,714 filed Apr. 7, 2021, and entitled PERSONALIZED LEARNING VIA TASK LOAD OPTIMIZATION.

GOVERNMENT LICENSE RIGHTS

This United States Government has rights in this invention pursuant to Contract No. DE-NA0001942 between the United States Government/Department of Energy and Consolidated Nuclear Security, LLC representing Y-12 National Security Complex and pursuant to Sub Contract 4300161819 between Consolidated Nuclear Security, LLC and Avrio Analytics, LLC.

FIELD

This invention relates generally to improvements in human information processing and learning. More specifically, this invention relates to a computer-implemented system and method for providing user-optimized training experiences.

BACKGROUND

In cognitive psychology, the cognitive task load theory (CLT) suggests that the human information process involves three main parts: sensory memory, working memory, and long-term memory. According to this theory, humans generally perceive or interact with new, incoming information or stimuli using their five senses (i.e., sight, hearing, smell, touch, and taste) via the sensory memory. The sensory memory is the first level of memory and it captures a short-term snapshot of the information and acts as a first buffer against all of the stimuli that could possibly be perceived by a person. Once a stimulus is perceived, a person must pay attention or focus on that stimulus in order to pass the information from the sensory memory to the longer-term working memory. Otherwise, the information is quickly disregarded and forgotten. Thus, the decision to pay attention or to not pay attention to certain information serves as a second filter for stimuli. The amount of working memory available to process new information is limited. It is believed that the working memory can hold between five and nine items (or "chunks") of information at any one time. Excess information is disregarded and forgotten. Moving information from working memory to long-term memory (i.e., encoding) requires the person to interact with the information numerous times, which is often called "rehearsal" of the information, and typically involves relating that information to past knowledge. Once information is stored in the long-term memory, further retrieval and rehearsal helps to prevent the decay of that memory (i.e., forgetting the information).

It is common to present new information to users in the form of educational trainings and simulations. These simulations are used to not only present the information but to also rehearse that information in order to move it through the information process discussed above to the user's long-term memory and retention. For example, it is common for firefighters to learn and practice their firefighting skills through written coursework and tests as well as through live firefighting exercises and demonstrations. However, these trainings are typically static and are universal (i.e., identical) for each user and are, for that reason, not optimized for each user. Each user is typically given the same written materials and participates in the same firefighting exercise, which presents the same problem and the same operating conditions. This method has proven to be a moderately effective way to teach new information. However, because the training is not unique or personalized for each user, the results of the training are not optimized.

The term "cognitive task load" or "task load" has been defined as the amount of mental effort or working memory resources exerted or required while reasoning and thinking. Any mental process, including memory, perception, language, etc., creates a cognitive task load because it requires energy and effort. Cognitive task loads range along a spectrum, which may be divided into three separate tiers according to the level of mental effort involved. At one end of the spectrum, a Tier I cognitive task load may be considered a minimal or "background" cognitive load, where the cognitive load is so low that a person's response is essentially instinctual and learning or development of skills is minimal or even non-existent. At the opposite end of the spectrum, a Tier III cognitive task load places the person into an overloaded state, where the load is too great and they are unable to effectively learn and retain information. Finally, between Tiers I and III, a Tier II cognitive load may be considered a "germane" cognitive load that is sufficient difficult/high to challenge the person and promote learning and retention of new information but not too difficult/high to hamper that learning and retention process.

As mentioned above, CLT suggests that the working memory has a limited capacity. This is an important consideration when designing instructional or educational courses. It is believed that, in order to achieve best results (i.e., better long-term retention and recall of information), instructional methods should avoid overloading the memory with additional activities that do not directly contribute to learning. Put differently, instruction that successfully manages the various forms of memory, including particularly the working memory by optimizing the cognitive task load (e.g., preferably to achieve a Tier II task load), can enhance understanding and retention of the information being conveyed. In addition to influencing understanding and retention, task loads can indicate a user's ability to perform a given task under different conditions. A measurement of task load can also provide insight for when a user's expertise is high enough, and consistent enough, for moving from a simulation to real-world execution.

However, each individual experiences varying degrees of cognitive task load for a given task or condition, including tasks and conditions that they might experience during a training exercise. As an example, one user (User A) in a given training exercise might be adversely impacted by a certain task or condition (Scenario X), which negatively impacts their ability to perform and to retain the information presented. At the same time, a different user (User B) might not be impacted or might, in fact, be positively impacted by Scenario X. At the same time, however, a different task or condition (Scenario Y) might not impact or might positively impact User A, while having a negative impact on User B. The differences between Scenario X and Scenario Y can be anything. In some cases, the tasks being performed in each scenario might be different, but the conditions under which they are performed might be identical. On the other hand, in other cases, the tasks being performed in each scenario might be identical but the conditions under which those tasks are performed might be different (e.g., night vs. day, hot vs. cold, stressful vs. relaxed atmosphere). The difference in physiological response to a given cognitive task load from one user to another user is believed to be the result of varying skillsets, prior training, differing biologies, etc. Thus, a given scenario or a given set of conditions might provide an effective training environment for one user but, at the same time, a detrimental training environment for a different user. It is noted here that each task in a training exercise might provide multiple sub-tasks that are each provided with a specific cognitive load that might vary from one sub-task to another sub-task.

What is needed, therefore, is a system and method for providing training experiences where the associated task load is adjusted on a per-user basis and on-the-fly (i.e., in real time) or immediately in response to the user's real-time performance and reaction to the tasks and conditions presented.

Notes on Construction

The use of the terms "a", "an", "the" and similar terms in the context of describing embodiments of the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "attached", "connected" and "interconnected", refer to a relationship wherein structures are secured or attached to one another either directly or indirectly through intervening structures, as well as both moveable and rigid attachments or relationships, unless otherwise specified herein or clearly indicated as having a different relationship by context. The term "operatively connected" is such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

As used herein, the phrase "training experience" or the term "experience", when referring to training exercises carried out using the presently-described training system, refers not only to the visual and audible content presented to a user during a training exercise, but also the conditions under which that training exercise takes place (e.g., minimum scoring/accuracy requirements, time limitations, correct posture or movement requirements, etc.).

As used herein, the phrase "biometric information" or "biometrics" means any observable data or telemetry exhibited by the user and is not limited to purely biological responses. Thus, this data could include, but is not limited to, biological data such as eye gaze, pupil dilation, breathing rate, heart rate, biomechanics, movement or sweat production. Biometric information might also include speech patterns, intonation, facial expressions or a written/verbal sentiment analysis. Additionally, the precise nature of the biometrics or biometric information observed or collected by the present training system might vary depending on the field or application for the training experience. On the other hand, as used herein, the phrase "performance metrics" includes, as non-limiting examples, the user's speed in traversing or accomplishing a training task, their accuracy in carrying out a training task, their communication with other user participants, etc. Some categories of information, such as a person's position or posture, eye movement, eye gaze, etc. might be considered biometric information or a performance metric, depending on the type of information that is being collected and the nature of the training experience. For example, in some cases, a user's posture (e.g., hunched) might be indicative of increased stress (i.e., biometric information), but the user is not being scored/analyzed for the appropriateness or accuracy of their posture. However, in other cases, such as when a person is participating in a shooting accuracy challenge, the person's posture and body positioning might be a performance metric.

As used herein, the phrase "user profile" means the assumptions and information collected by or provided to the present training system and associated with one user or a group of users. User profiles may or may not be specific to a single individual. For example, at initialization, the same basic or default user profile might be established for all users, which profile might be based on average statistics of a relevant population of individuals. As the training system collects additional information related to the one or more users, the associated user profiles are preferably further refined (i.e., customized). Machine learning algorithms utilized in connection with the present training system are trained, in part, using the information included in user profiles to determine task loads. Then, based on this information and training and for a given set of biometric data and/or performance data, the algorithms are able to automatically predict a task load.

As used herein, the phrase "AR device" refers to peripheral devices used in connection with this training system in addition to the display. These AR device might include, for example, devices that include microphones, speakers, and haptics. As a more specific example, one such AR device might be an AR headset having speakers and a microphone and also providing the display. In another example, an AR device might be haptic gloves or a haptic suit for the user to wear. In still another example, an AR device might be a prop, such as a pistol, for interacting with the training experiences provided by the training system.

SUMMARY

The above and other needs are met by a method for providing task load-optimized computer-generated training experiences to a user using a training system. The training system includes: a display, a computer-based training simulator configured to generate and to display the training experiences, a prediction program (ML1), and a training optimization program (ML2). In use, ML1 provides a predicted actual task load of the user when provided with biometric information or performance metric information. On the other hand, ML2 provides a training experience recommendation when provided with a training goal and a predicted optimal task load. Within the method, in response to receiving a training goal and a predicted optimal task load, a first training experience recommendation is provided by ML2. That recommendation relates to the training content and/or training conditions that ML2 predicts will, if utilized in providing a training experience to the user, result in the predicted actual task load of the user equaling the predicted optimal task load when the user interacts with the training experience. Next, a first training experience is provided to the user with the training simulator. In response to receiving biometric information or performance metric information while the user interacts with the training experience, ML1 determines the user's predicted actual task load. Then, if the predicted actual task load does not match the predicted optimal task load, ML2 provides a second training experience recommendation that includes a recommendation related to the training content and/or training conditions that ML2 predicts will, if utilized in providing a training experience to the user, result in the predicted actual task load of the user equaling the predicted optimal task load when the user interacts with the training experience. Lastly, an updated and different second training experience is provided to the user by the training simulator, wherein at least one of the training content or the training conditions is changed.

BRIEF DESCRIPTION OF THE DRAWINGS

Further advantages of the invention are apparent by reference to the detailed description when considered in conjunction with the figures, which are not to scale so as to more clearly show the details, wherein like reference numerals represent like elements throughout the several views, and wherein.

DETAILED DESCRIPTION

Figure 1:
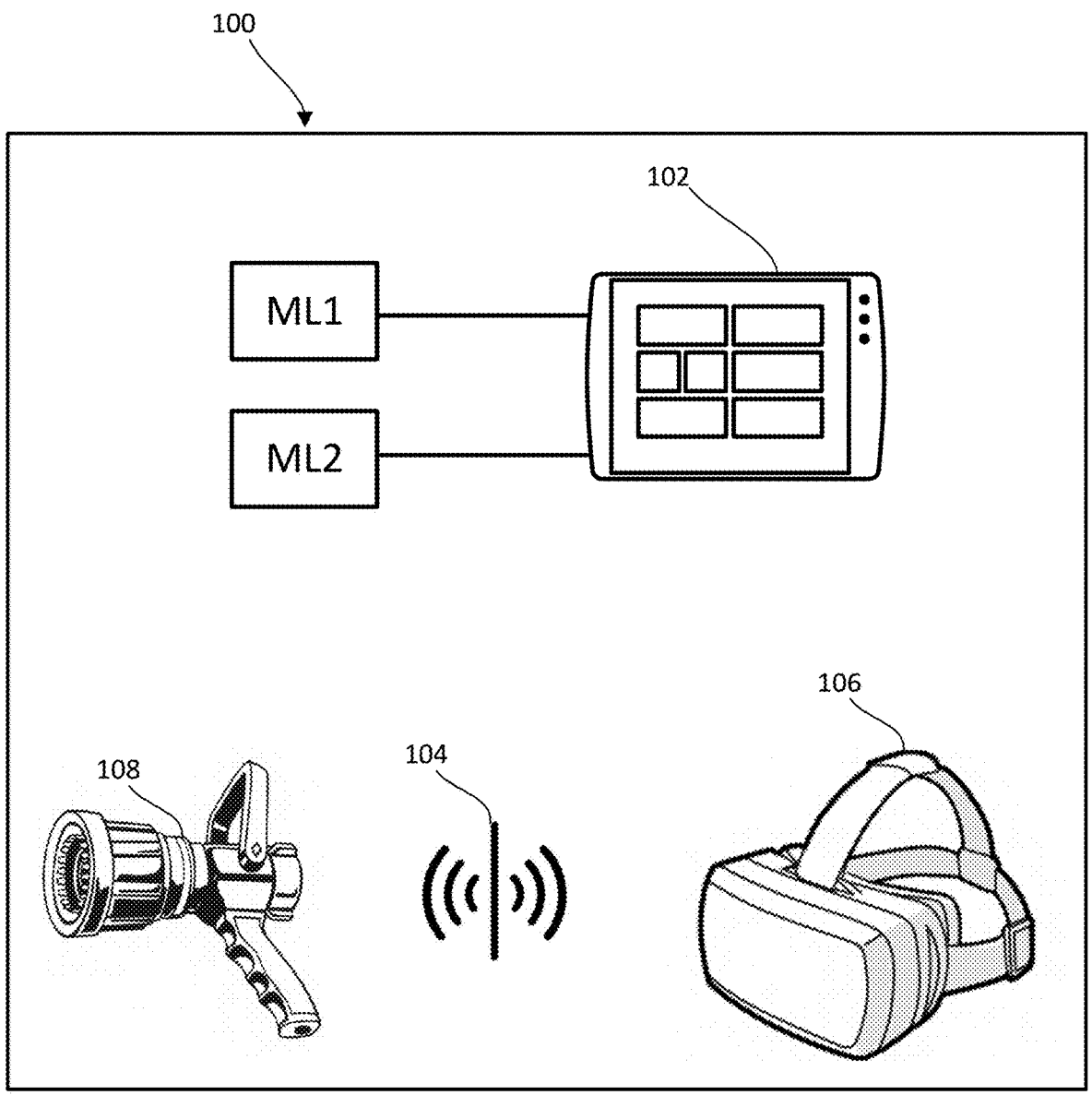
FIG. 1 depicts a training system for generating, presenting, and personalizing a simulated training experience for a user of the training system according to an embodiment of the present invention.

Now, with reference to FIG. 1, there is shown a training system 100 for generating, presenting, and personalizing a simulated training experience for a user of the training system. The training system 100 includes a computer-based training simulator 102 for generating and providing the simulated training experience to the user. The training simulator 102 may be one or more of any type of general purpose computer, tablet, etc. that is suitably equipped for this purpose. The training simulator 102 is provided with a first machine learning algorithm (ML1), which may also be referred to as a "prediction program," for calculating a predicted actual task load experienced by the user associated with the user's interaction with the simulated training experience. The training simulator 102 includes a second machine learning algorithm (ML2), which may also be referred to as a "training optimization program," for providing a training experience recommendation that would cause the predicted actual task load to align or match a predicted optimal task load for achieving a specified training goal. The system 100 is configured to collect one or more of the following: biometric information, performance metric information, and task load information related to the user both during and/or after training activities carried out using the training simulator 102. This information is collected via an information collection means 104, which, as discussed further before, includes various types of sensors, etc. and is dependent on the nature of the information being collected. Finally, a display 106 is provided that displays the training experience to the user. In this case, the display 106 is a headset having built-in speakers and a built-in monitor (optionally, also including a microphone) for viewing displayed images and that might be used in connection with virtual reality (VR) or augmented reality (AR) games, presentations, etc. In the description that follows, the term "AR" refers to both AR and VR, unless otherwise noted. In certain preferred embodiments, the training system 100 may also include at least one other AR device 108 that is provided with and that works alongside the display 106 for interacting with the training content provided by the training simulator 102. For example, in the present case, the AR device 108 is illustrated as a fire nozzle or bale that may be used to interact with a fire fighting AR simulation (e.g., to fight fires). In other cases, additional and different AR devices 108 may be provided with the training system 100, depending on the nature of the training experience. For example, the AR device 108 might be a pistol in a shooting simulation or forceps or a scalpel or suture material in a surgical simulation. In each case, the AR device 108 is used to interact with the training simulation provided by the training simulator 102. The AR devices 108 may be equipped with speakers, microphones, lights, haptics, functional components (e.g., working trigger), etc. to allow for a realistic interaction of the user with the training experiences provided.

Initialization

Before it is used by users with actual training experiences, the training system 100 should be initialized by being trained for a specific user or group of users. Since each user reacts differently to different training tasks and training conditions, this initialization step helps to customize the training system 100 for a particular user, including by identifying how and to what extent a user's biometrics change in response to different tasks and conditions. This establishes a baseline or user profile for that user (or group of user) that can then later be used in tailoring actual training activities for optimizing the training for that particular user.

Figure 2:
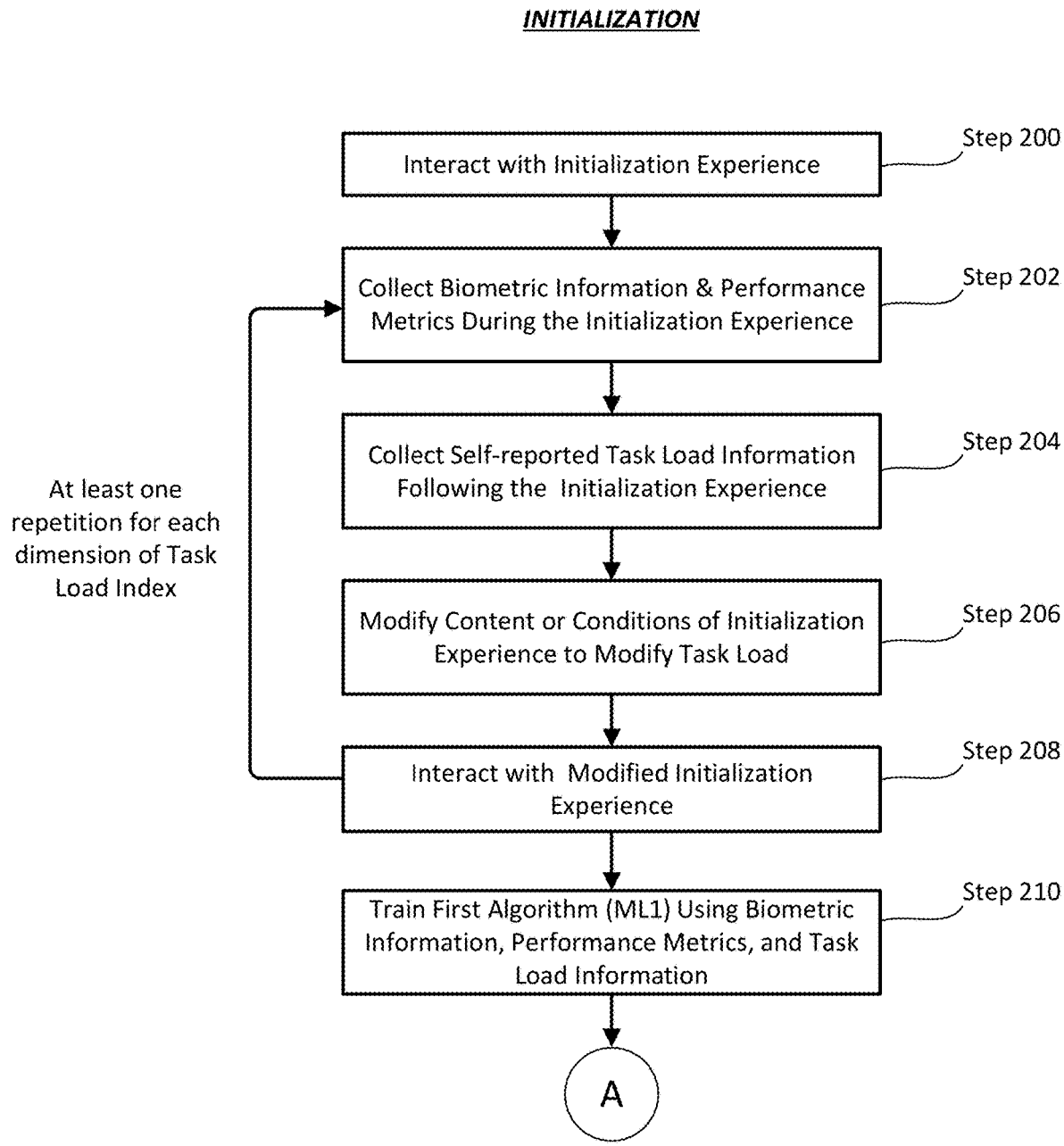
FIG. 2 illustrates an initialization process that may be used in initializing the training system shown in FIG. 1.

The above-described initialization process for the training system 100 is graphically depicted in FIG. 2. As shown, in order to validate the use of biometrics as indicators of cognitive task load, one or more experiments are initially run on a sample of users, with a meaningful sample size, in an initializing step. The first step in this process is for the users of the training system 100 to interact with an initialization experience (Step 200) using the training system 100. The initialization experience should be selected such that user's performance is minimally influenced by latent factors such as prior training or existing expertise. Such an experience might involve very simple tasks that are unrelated to the actual training experiences. An ideal initialization experience might include the performance of a task where the expected level of performance, procedure, and outcome objective are fully defined and documented. Preferably, the initialization experience involves generic, routine or ordinary tasks and there are preferably no stressor factors in place. One purpose of performing this initialization experience is to understand the user's natural response to training experiences generally. For example, where the training system 100 is to be used for training firefighters on proper firefighting techniques, one suitable initialization experience might involve playing a game of tic-tac-toe. The initialization experience, which is provided via the training simulator 102, incorporates at least one adjustable dimension that may be independently modified through adjustments to the training content or training conditions in order to modify the task load on the user when the user interacts with the initialization experience. However, the adjustable dimensions are preferably initially set to a baseline level with minimal or, more preferably, no stressors added.

Biometric data and performance metrics are collected from users while they interact with the initialization experience (Step 202) by whatever information collection means 104 are available and appropriate, based on the type of information being collected. As non-limiting examples, biometric information may be captured via thermometers or thermocouples, facial recognition cameras, fingerprint scanners, iris recognition scanners, microphones powered with voice recognition capabilities, body moisture detectors, motion and position sensors (e.g., accelerometers), keystroke and mouse tracking software, gait detection software and imaging, etc.

Additionally, each user will be asked to self-report their cognitive task load, preferably immediately following the initialization experience. This task load information is preferably provided via a task load index (or TLX) (Step 204). In general, a TLX is a validated multi-item questionnaire that looks across various axes that are relevant to the fields in which the users are training and accounts for varying load types that may be experienced in a real-world scenario. The selected TLX could be an existing TLX. For example, the NASA-TLX index was developed by the National Aeronautics and Space Administration (NASA) for use in assessing perceived individual cognitive task load among the general population. The NASA-TLX task load dimensions of task load are: (1) mental demand, (2) physical demand, (3) temporal demand, (4) performance, (5) effort, and (6) frustration level. Similarly, the surgery TLX (SURG-TLX) was specifically developed and validated to measure cognitive task load among individuals within a surgical team, and the task load dimensions are: (1) task complexity, (2) physical demand, (3) mental demand, (4) distraction, (5) situational stress, and (6) temporal demands. On the other hand, the selected TLX may be newly-created specifically for the initialization experience and/or other similar experiences. For purposes of the presently-disclosed system and method, the task load information received via the TLX responses are treated as the "actual" task load that the user is experiencing since the users themselves are providing that information.

Preferably, a sufficient number of iterations of the initialization experience are run under a sufficient number of different conditions in order to obtain a range of responses from the user when various stressors are placed on them, which allows for the user's natural response to stressors along each dimension of the TLX to be better understood. Thus, the next step in the initialization process is to modify the initialization experience, including the training content and training conditions, in order to modify (i.e., to increase or decrease) the task load associated with one or more dimensions of the selected TLX (Step 206). The task load can be increased or decreased by whatever means are appropriate for the selected teaching platform, for the selected task load dimension. For example, if the initialization experience involves playing tic-tac-toe, the time allowed for each player to make their move may be adjusted, the number of simultaneous games being played may be increased, the level of background noise can be altered, etc. Again, this modified experience is preferably generated and provided via the training simulator 102. During each iteration of these modified initialization experiences, biometric information and performance metrics are collected, and after each iteration users are asked to self-report on the relevant TLX to indicate their perceived task load for the most recent iteration (i.e., Step 204 is repeated). Preferably, this is repeated several times (Step 208). Unlike the TLX responses, the biometric data and performance metrics are not treated as the "actual" task load that the user is experiencing; instead, these data may be used as a predictor of the actual task load. By training ML1 by correlating, preferably through one or more mathematical relationships, the TLX response data (i.e., representing the actual task load) with the biometric information and performance data (i.e., representing a predicted actual task load) (Step 210) during this initialization process, as represented by the formula below, an estimation or prediction of the actual task load may be obtained in future training experiences without requiring the user to provide TLX response data. Instead, this predicted actual task load may be calculated with the ML1 algorithm based on the biometric information and performance data only, which information is obtained from the user during their interaction with the training experience. Advantageously, this allows for the task load to be predicted in real-time while the user is engaged with the training experience. In certain preferred embodiments, ML1 is automatically updated when or in response to new biometric information, performance metric information, or task load information being received in order to improve its predictions and to further customize those predictions for a specific user or group of users.

| Actual Task Load | Predicted Task Load |
|---|---|
| TLX Response Data ≅ | f(Biometric Information, Performance Data) |

Figure 3A:
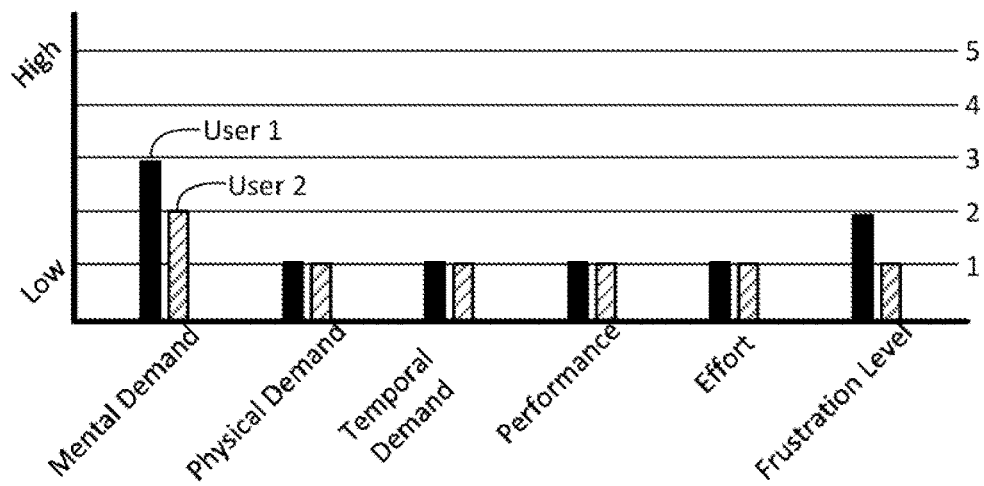
FIG. 3(A) is a first graph illustrating cognitive task loads for two users following a first training experience according to an embodiment of the present invention.
Figure 3B:
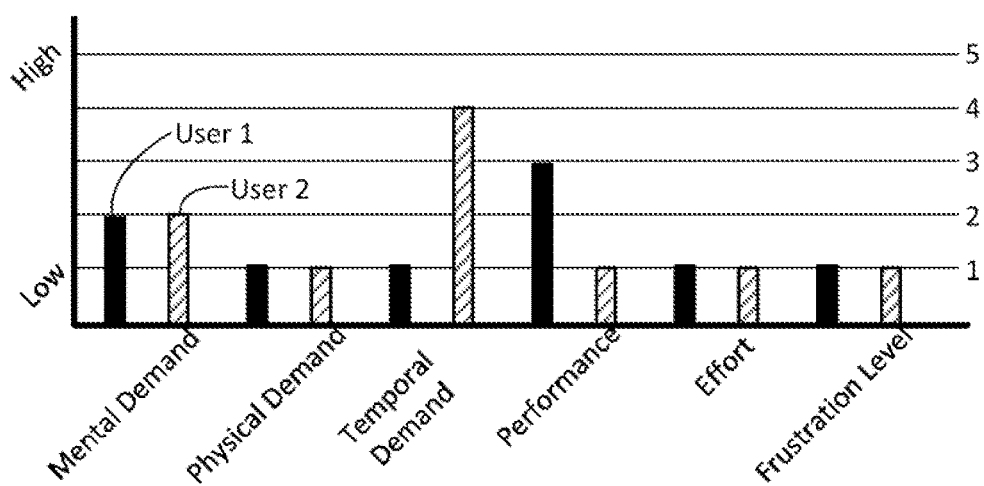
FIG. 3(B) is a second graph illustrating cognitive task loads for two users following a second training experience according to an embodiment of the present invention.
Figure 3C:
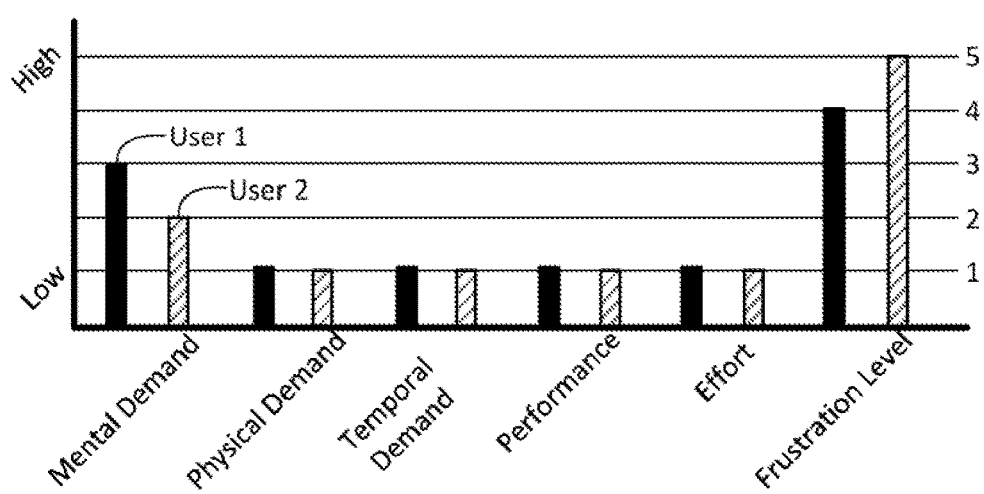
FIG. 3(C) is a third graph illustrating cognitive task loads for two users following a third training experience according to an embodiment of the present invention.

The charts shown in FIG. 3(A), FIG. 3(B), and FIG. 3(C) provide results of three hypothetical initialization experience iterations involving two different users (i.e., User 1 and User 2). In this particular instance, the NASA TLX dimensions are used to gauge the task load on each user. Again, this task might be as simple as playing a game of tic-tac-toe. In FIG. 3(A), a basic game of tic-tac-toe is played without any additional stressors. The graph demonstrates that playing the game is naturally more mentally demanding and frustrating for User 1 than it is for User 2. The game is repeated and the conditions of the game are changed. For example, in FIG. 3(B), each user might be given only 2 seconds to make each of their moves in the game instead of having an unlimited amount of time to decide. When comparing the results of this iteration to the base iteration in FIG. 3(A), this hypothetical change resulted in reduced mental demand, reduced frustration level, but an increased performance demand on User 1, whereas the same change resulted only in an increase in the temporal demand for User 2. With respect to User 1, this iteration of the game is less than ideal since multiple dimensions changed at the same time. This iteration of the game is more useful for understanding how User 2 is impacted by changes in time and time limitations. Nevertheless, for both users, this iteration of the game is informative because it indicates that changes in time and time limitations is a possible stressor on each user that can be used in later training experiences to modify these users' training experience. The conditions of the game continue to be changed in order to, ideally, result in changes in each of the different dimensions. For example, in the case graphed in FIG. 3(C), each of the users might play a game of tic-tac-toe where they are each subjected to the sound of a continuous emergency siren. Judging from the graph, this change results in a similar change in the frustration level for both users, while the other 5 dimensions remain unchanged. Again, this change is informative because it indicates that each of these users are impacted by auditory distractions, and this can be used in later training experiences to modify these users' training experience.

Finally, in certain embodiments, in the case of multi-user tasks (e.g. games of tic-tac-toe with two players), the experiment users can be divided into multiple cohorts to assess the impact of variations in the user's and their opponent's actions during the game. In certain embodiments, these cohorts will experience varying methods of applying increased task loads. For example, a two-user task may have three cohorts treated as follows:

Cohort A: Both users experience task loads increased along the same dimension;
Cohort B: Users experience task loads increased along differing dimensions from each other; and
Cohort C: One user experiences the task load increased along a given dimension, while the other experiences no increase in task load.

Training Optimization

Once the training system 100 has been initialized, it can be used for optimizing actual training. The process discussed below provides one example of how a training experience may be optimized. The actual steps discussed below may occur in any order and occur any number of times.

As noted above, a primary purpose of the ML2 algorithm is to provide training experience recommendations that would cause the predicted actual task load, as determined by ML1, to align or match a predicted optimal task load for achieving a specified training goal. Based on the recommendations from ML2, the training experience can be customized by the user or, in certain embodiments, the training system 100 itself.

Figure 4:
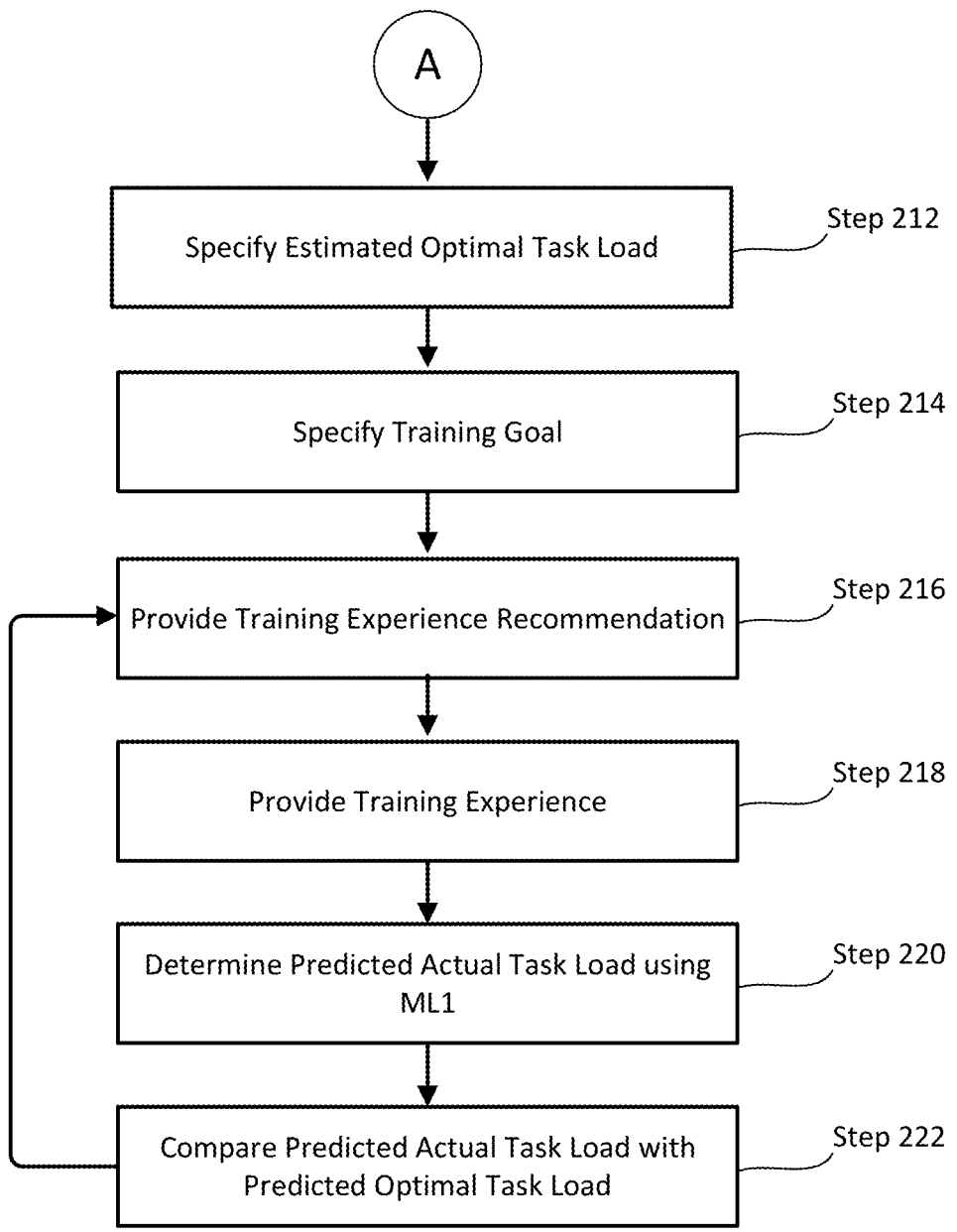
FIG. 4 illustrates a training process that may be used in providing a training experience to a user of the training system shown in FIG. 1.

Thus, with reference to FIG. 4, a first step in the training optimization process is to specify the estimated optimal task load(s) for different training goals (Step 212), which is the task load that is thought to be most likely to enable a user to achieve the training goal. For example, if the task load ranges from 1 (easiest) to 5 (hardest), the estimated optimal task load for learning new material might be 1.4 and the optimal task load for testing learned material might be 4.7. In the presently-disclosed system, this estimated optimal task load is provided to the training system 100. Preferably, the training system 100 and, more particularly, the ML2 algorithm are taught the estimated optimal task load(s) that should be used for multiple training goals. The data might be provided, for example, from cognitive learning standards, domain expert recommendations.

The ML2 algorithm is provided with the specified desired training goal (e.g. maximizing learning metrics or incrementally increases stressors to increase expertise) (Step 214) for a particular training session or a series of training sessions or sub-tasks (i.e., multiple tasks within a single training experience). Again, the ideal cognitive task load for one type of training (e.g., introducing new material) is likely different from the ideal cognitive task load for another type of training (e.g., final review of skills before real-world application). As such, specifying the desired training goal is an important initial step for customizing training experiences for users. From there, ML2 looks up the optimal task load for that specific goal. This optimal task load information is preferably previously provided, such as by a lookup table or database. However, it is noted that providing a specific training goal is not required for the present system to operate. In some cases, an optimal task load may be specified by a user. In other cases, the optimal task load determined by ML2 may be overridden by a user.

Preferably, after being provided with a training goal and an optimal task load, training system 100, via the ML2 algorithm, provides a training experience recommendation (Step 216) that includes a recommendation related to at least one of training content and training conditions that ML2 predicts will, if utilized in providing a training experience to the user, result in the predicted actual task load of the user equaling the predicted optimal task load when the user interacts with the training experience. In other words, ML2 preferably informs a user (or the training simulator 102) of the type of content and operating conditions that it believes will provide an estimated optimal task load and that is most likely to enable a user to achieve the training goal. Preferably, ML2 is also configured to make recommendations concerning entire training protocols, including for training experiences comprised of multiple different training sessions or parts. For example, a beginning firearms training experience might include 5 different modules or sessions to introduce, practice, and then review basic firearms handling, etc. In that case, the optimal task for each of those sessions is likely different and progressively higher. ML2 is preferably able to make recommendations for each of these training sessions, where those recommendations are appropriate for the particular phase of the training experience. In such cases, it is preferred that the user must sequentially interact with each of the training sequences in order to complete the overall training experience. As such, in certain preferred embodiments, certain training experiences provide multiple related training sequences (or training exercises) where the content and content recommended by ML2 would result in different (e.g., increasingly higher) task loads across the training experience. Also, it has been found that periods of low task load following high task load periods can allow for greater retention of information. It is believed that, during these periods of low task load, information is moved from working memory to long-term memory. Thus, in general, the system may provide a sequence of training sessions that have different task loads. However, it is preferred that, on average, the sequences have increasingly high task loads.

Preferably, following the receipt of a recommended task load, the training simulator 102 provides a training experience to the user that is based on that recommended task load (Step 218). In particular, training content is generated or training conditions are altered (or both) in order to achieve the optimal task load, if selected, or another task load that is selected. In preferred embodiments, this generation and alteration of the training experience preferably occurs in real time. In some embodiments, the users adopts the recommendations and the training content and training conditions recommended by ML2 are generated by the training simulator 102. However, in other cases, the user can ignore the recommendations and utilize different training content and training conditions, which are also generated by the training simulator 102. In certain cases, the training system 100 automatically adopts ML2's recommendations in providing the training experience, which allows for the training content and training conditions to be modified automatically without user input.

As discussed above with respect to the Initialization process, during each training experience, biometric information and performance metrics are collected. Advantageously, since the ML1 algorithm was previously trained during the Initialization process, task load data from a TLX is not necessary to calculate a predicted actual load. Instead, in response to receiving performance metrics and and/or biometric information, ML1 can determine the predicted actual task load (Step 220). The predicted actual task load is then compared against the predicted optimized task load to ensure that they coincide (Step 222). Following that determination, if the predicted actual task load does not coincide with the predicted optimal task load, the training experience and/or the optimal task load might be updated. For example, suppose ML1 indicates that the user's predicted actual task load is only 2.1 on a scale of 1-5 but ML2 previously recommended a task load of 4.5 in a final review of this particular user's skills. Further, in this scenario, the performance metrics demonstrate that user performed the task unusually quickly or flawlessly. In that case, these indicators might suggest that the training experience content and conditions are too easy for the intended training goal. In certain embodiments, the training experience recommendations are sufficient to adjust the training experience on an adjustable dimension-by-adjustable dimension basis. For example, ML2 might determine that mental demand and physical demand are too high, whereas temporal demand is too low. In that case, ML2's recommendation might be multi-faceted and include recommendations that impact the training experience on a dimension-by-dimension basis.

EXAMPLE

The following scenario relates to the user training experience phase, which occurs after the training system has been initialized. Thus, it is assumed that the ML1 and ML2 algorithms have been previously trained using a baseline task.

In this scenario, a typical firefighting training task using the presently-disclosed system 100 may be a virtual hose attack scenario. In this scenario, via the headset 106, a firefighter user may be presented with a virtual room filled with virtual smoke and fire in an AR or VR environment. The user is tasked with demonstrating proper hose attack methods (e.g., where the hose water is directed and what movement pattern of the hose the user uses) to suppress the fire within a given time frame. In evaluating the user's performance, their performance may be calculated and judged based on hose attack pattern and methodology (e.g., directing water to the base of the fire), positioning and movement relative to the fire (e.g., hazard avoidance, maintaining proper distance), total time taken to suppress the fire, etc. During the training experience, biometric data as well as data on the above performance metrics will be collected by the information collection means 104, display 106, or AR device 108. Using the ML1 algorithm, the data will be used to calculate the user's predicted actual task load across the various dimensions in real-time as the user completes the training task.

Over time, as the user continues to train and their cognitive task load changes, the ML2 algorithm identifies changes that are needed to optimize training for the desired cognitive task load in the user. In particular, it is anticipated that the user's task load will decrease as they become more proficient in suppressing fires. This decrease will be detected by the ML1 algorithm as a lower predicted actual task load, which indicates that more difficult training experiences can be provided to continue to improve and refine the user's firefighting skills. As such, the output of this ML2 algorithm is used to alter the content of the training experience, which may include increasing the smoke or fire intensity, increasing the spread rate of the fire or introducing entirely new hurdles (e.g., low water pressure in the hose). As a specific example, when ML1 determines that the user is not experiencing sufficient task load, ML2 may then recommend certain changes to optimize the task load in real time. For example, these changes might include: increasing fire spread rate (i.e., growth of the fire per minute) by 50%, increasing smoke density by 40% to further reduce visibility, lowering hose pressure by 15% to increase time to suppress the fire.

As the user proceeds in the scenario with increased difficulty, ML1 may determine the actual predicted task load and then ML2 may determine that that task load is too high along certain dimensions to support training objectives compared to the optimal task load previously specified. As a result, ML2 may recommend further changes to the content in real time. For example, these changes might include: decreasing fire spread rate by 30%, smoke density is unchanged, and hose pressure returned to normal. The real time assessment of task load and real time changes proceed throughout the training session in order to provide a fully personalized and optimized training session to the user.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations as would be appreciated by those having ordinary skill in the art to which the invention relates.

What is claimed is:

1. A method for providing task load-optimized computer-generated training experiences to a user using a training system that includes: a display, a computer-based training simulator configured to generate and to display via the display the training experiences, a prediction program (ML1), and a training optimization program (ML2), wherein ML1 is configured to provide a predicted actual task load of the user when ML1 is provided with biometric information or performance metric information and wherein ML2 is configured to provide a training experience recommendation when provided with a predicted optimal task load, the method comprising the steps of:

with ML2, in response to a predicted optimal task load, providing a first training experience recommendation that includes a recommendation related to at least one of training content and training conditions that ML2 predicts will, if utilized in providing a training experience to the user, result in the predicted actual task load of the user equaling the predicted optimal task load when the user interacts with the training experience;

with the training simulator, providing a first training experience to the user;

with ML1, in response to receiving biometric information or performance metric information while the user interacts with the training experience, determining the user's predicted actual task load;

in response to receiving the predicted actual task load, if the predicted actual task load does not match the predicted optimal task load, providing a second training experience recommendation with ML2 that includes a recommendation related to at least one of training content and training conditions that ML2 predicts will, if utilized in providing a training experience to the user, result in the predicted actual task load of the user equaling the predicted optimal task load when the user interacts with the training experience and then, with the training simulator, providing an updated and different second training experience to the user, wherein at least one of the training content or the training conditions is changed.

2. The method of claim 1 further comprising the steps of:

with the training simulator, providing an initialization experience comprised of training content and training conditions and that incorporates a plurality of adjustable dimensions that may each be independently modified in order to modify a task load on the user while the user interacts with the initialization experience but where the plurality of adjustable dimensions are set at a baseline level;

with the training simulator, providing a modified initialization experience to the user, wherein at least one of the training content or training conditions has been modified such that at least one of the plurality of adjustable dimensions is modified from the baseline level in order to modify the task load on the user while the user interacts with the modified initialization experience;

in response to the training system receiving: (1) at least one of biometric information or performance metric information while the user interacts with the first training experience and the modified first training experience and (2) task load information after the user has interacted with the first training experience and the modified first training experience, correlating through one or more mathematical relationships the at least one biometric information and performance metric information with the task load information;

training ML1 using the correlated information such that, once trained, ML1 is configured to predict the user's task load when ML1 is provided with biometric information or performance metric information and in the absence of task load information.

3. The method of claim 1 wherein the second training experience is provided to the user in real time when the training simulator determines that the predicted actual task load does not match the predicted optimal task load.

4. The method of claim 1 comprising the step of providing a plurality of training sequences with the training simulator, each with a predicted optimal task load, that the user must interact with in sequence in order to complete each of said first and second training experiences.

5. The method of claim 4 comprising the steps of:

in response to receiving at least one of biometric information and performance metrics while the user interacts with each of the plurality of training sequences, calculating a predicted actual task load during each of the plurality of training sequences;

in response to receiving the predicted actual task loads, if the predicted actual task load of one or more of the plurality of training sequences differs from the corresponding predicted optimal task load, providing a training experience recommendation with ML2 that includes a recommendation related to at least one of training content and training conditions that ML2 predicts will, if utilized in providing a training experience to the user, result in the predicted actual task load of the user equaling the predicted optimal task load when the user interacts with the training sequences and then, with the training simulator, providing an updated and different plurality of training sequences with the training simulator, wherein at least one of the training content or the training conditions is changed for one or more of the sequences.

6. The method of claim 1 wherein the task load information is provided by the user via a task load index.

7. The method of claim 1 wherein at least one of the first training experience recommendation and the second training experience recommendation is utilized for the first training experience and second training experience, respectively.

8. The method of claim 1 wherein the at least one of the first training experience recommendation and the second training experience recommendation is automatically adopted and utilized by the training simulator.

9. The method of claim 1 wherein at least one of the first training experience recommendation and the second training experience recommendation is not utilized for the first training experience and second training experience, respectively.

10. The method of claim 1 wherein the second training experience recommendation will, if utilized in providing a training experience to the user, result in a decrease to at least one of a plurality of adjustable dimensions that may be modified in order to modify a task load on the user while the user interacts with the training experience.

11. The method of claim 1 wherein the second training experience recommendation will, if utilized in providing a training experience to the user, result in an increase to at least one of a plurality of adjustable dimensions that may be modified in order to modify a task load on the user while the user interacts with the training experience.

12. A training system for generating, presenting, and personalizing a simulated training experience for a user of the training system, the training system comprising:

a computer-based training simulator for providing the simulated training experience to the user, the training simulator having: a first machine learning algorithm (ML1) for calculating a predicted actual task load experienced by the user during the user's interaction with the simulated training experience; a second machine learning algorithm (ML2) for recommending adjustable dimension settings for obtaining an optimal task load based on an optimal task load provided to the training system; and a display configured to display the training experience to the user, wherein the training simulator is configured to:

provide an initialization experience to the user that incorporates training content, training conditions under which a user must operate when viewing or interacting with the training content, and adjustable dimensions that may be independently modified by modifying the training content or training conditions in order to modify a task load on the user while the user views and interacts with the initialization experience, wherein each of the adjustable dimensions is set at a baseline level;

provide a modified initialization experience to the user, wherein at least one of the adjustable dimensions is modified in order to modify the task load on the user while the user interacts with the modified initialization experience;

collect at least one of biometric information and performance metrics while the user interacts with the initialization experience and modified initialization experience;

collect task load information after the user has interacted with the initialization experience and modified initialization experience;

train ML1 by correlating the collected biometric information and performance metrics with the collected task load information;

provide a first training experience to the user that is different from the initialization experience and the modified initialization experience and that incorporates training content and training conditions under which a user must operate when viewing or interacting with the training content and that also incorporates adjustable dimensions that may each be independently modified by modifying the training content or training conditions in order to modify a task load on the user while the user views and interacts with the first training experience;

receive a predicted optimal task load;

using ML2, based on the optimal task load, provide a recommendation concerning the training content and training conditions for obtaining a training goal with the first training experience;

using ML1, based on biometric information and performance metric information collected while the user interacts with the first training experience, determining the predicted actual task load on the user;

if the predicted actual task load does not match the predicted optimal task load, using ML2, provide a recommendation concerning the training content and training conditions for obtaining the training goal with the first training experience; and provide a second training experience to the user that is different from the initialization experience, the modified initialization experience, and the first training experience and that incorporates training content and training conditions under which a user must operate when viewing or interacting with the training content and that also incorporates adjustable dimensions that may each be independently modified by modifying the training content or training conditions in order to modify a task load on the user while the user views and interacts with the second training experience.

13. The training system of claim 12 further comprising an AR headset that is sized and configured to be worn by the user and that includes the display such that, when the AR headset is worn, the simulated training experience is visible to the user via the AR headset.

14. The training system of claim 13 further comprising at least one AR device in addition to the AR headset, wherein the at least one AR device is configured to be used by the user to interact with the simulated training experience.

15. A method for a user to train with task load-optimized computer-generated training experiences using a training system that includes: a display, a computer-based training simulator configured to generate and to display via the display the training experiences, the user carrying out the steps of:

via the display, viewing training content of a first training experience provided by the training simulator;

interacting with the first training experience under training conditions;

providing at least one of biometric information and performance metric information to the training system while interacting with the first training experience and viewing the training content;

when the training simulator determines that a predicted actual task load of the interaction does not match an optimal task load provided to the training simulator and, in response to that determination, provides a different second training experience to the user, viewing, via the display, training content of the second training experience and interacting with the training content of a second training experience under training conditions.

16. The method of claim 15 wherein the display is integrated into an AR headset.

17. The method of claim 15 wherein the user interacts with the training experience using an AR device.

18. The method of claim 15 further comprising the step of training the training simulator to calculate a predicted actual task load based on the biometric information or performance metric information.

19. The method of claim 18 wherein the user trains the training simulator by providing task load information and at least one of biometric information or performance metric information, which are then correlated by the training simulator.

20. The method of claim 1 wherein task loads range along a spectrum and include Tier I cognitive loads that provide a background cognitive load, Tier III cognitive loads that provide a load that places a user into an overloaded state that hampers learning or retention of information, and Tier II cognitive loads that are between Tier I and Tier III and that provide a germane cognitive load, and wherein the predicted optimal task load is a Tier II task load.

* * * * *